United States Patent Office 3,129,699
Patented Apr. 21, 1964

3,129,699
DIESEL FUEL CONTAINING A HETEROCYCLIC POLYAMINE SALT
Allen F. Millikan, Crystal Lake, Ill., assignor to The Pure Oil Company, Chicago, Ill., a corporation of Ohio
No Drawing. Filed Nov. 24, 1961, Ser. No. 154,873
15 Claims. (Cl. 123—1)

This invention relates to improved diesel fuels and, more particularly, to diesel fuels containing small amounts of heterocyclic polyamine salts of organic acids added to improve the ignition characteristics of the diesel fuel.

In the operation of a diesel engine, a petroleum fuel is injected into the engine combustion chambers containing air which has been previously compressed to a sufficient pressure and temperature to ignite the injected fuel. The ease with which it is ignited after being injected into a combustion chamber, is one of the most important specifications of a diesel fuel. Fuels having poor ignition characteristics exhibit an unduly long ignition lag between the time the fuel is injected and the time it is ignited. This ignition quality of diesel fuels is conventionally expressed in terms of cetane numbers. The cetane number of a given fuel is the percentage of n-cetane, a fast-burning paraffinic constituent, in a mixture of n-cetane and alpha-methylnaphthalene having the same ignition delay characteristics as the fuel in question. For example, a diesel fuel having a cetane number of 40 would have the same ignition delay characteristics as a mixture of n-cetane and alpha-methylnaphthalene containing 40% by weight of n-cetane. It is important that diesel fuels have good ignition characteristics since the use of fuels having too great an ignition lag period, i.e., too low a cetane number, cause excessive engine knocking and rough running, thereby reducing the efficiency and life of the engine.

The addition of certain compounds to diesel fuels which will act as ignition accelerators, thereby decreasing the ignition-delay period, is well known. For example, numerous cetane-number improvers are listed on pages 506 to 510 of "Petroleum Refining with Chemicals," by V. A. Kalichevsky and K. A. Kobe, published by Elsevier Publishing Company in 1956. The addition of ignition accelerators to diesel fuel improves the better grades of diesel fuels, and widens the range of available fuels by increasing the ignition quality of lower grade fuels to a point where they can be satisfactorily used.

This invention is based upon the discovery that diesel fuels of improved ignition quality can be obtained by admixing with the fuel a minor amount of an oil-soluble salt formed by the combination of a heterocyclic polyamine with an organic acid, including organic compounds containing inorganic acid radicals.

It is an object of this invention to provide a composition comprising a major portion of a petroleum oil and a minor portion of an oil-soluble salt of a heterocyclic polyamine and an organic acid. Another object of this invention is to provide a diesel fuel of improved ignition characteristics. A still further object of this invention is to provide a diesel fuel containing a small amount of an oil-soluble salt of a heterocyclic polyamine and an organic acid. Other objects of this invention will become manifest from the following disclosure.

In accordance with this invention, there is added to diesel fuel oil a small amount of an oil-soluble salt of a heterocyclic polyamine containing at least one atom of nitrogen in the tri-coordinated state, such as hexamethylenetetramine, and an organic acid, including organic compounds containing inorganic acid radicals. In general, the heterocyclic polyamines which may be used in forming the salts useful in this invention include cyclo di-, tri- and tetramines. In addition to tetramines, such as hexamethylenetetramine, other heterocyclic polyamines which may be used in forming the oil-soluble salts useful in this invention include triamines such as the trialkylcyclotrimethylenetriamines,

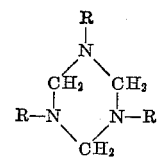

which can be prepared by reacting primary aliphatic amines and formaldehyde; piperazine and alkyl-substituted piperazines; and alkylisomelamines,

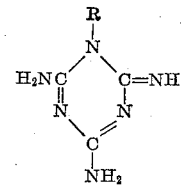

with R in the above formulas being alkyl groups containing 1–8 carbon atoms.

The acids with which the heterocyclic polyamines are combined to form the oil-soluble salts useful in accordance with this invention include aliphatic acids, aromatic acids, alicyclic acids, and organic compounds containing inorganic acid radicals. The aliphatic acids can be saturated or unsaturated, monocarboxylic or polycarboxylic acids, such as caproic, n-heptylic, capric, lauric, myristic, oleic, ricinoleic, vaccenic, alkylsuccinic, alkylglutaric, alkyladipic acids, and acids produced by the oxidation of hydrocarbons such as paraffin wax and petroleum. Examples of aromatic acids are monobasic acids such as benzoic, toluic, and salicyclic acids, and polybasic acids such as phthalic acids. Examples of cyclic acids are naphthenic acids, abietic acid, and cyclohexylacetic acid. Organic compounds containing inorganic acid radicals include organic sulfonic acids such as benzenesulfonic acid, toluenesulfonic acid, and petroleum sulfonic acids derived from various petroleum fractions, and phosphorous-containing acids, such as obtained by reacting $P_2S_5$, $P_2O_5$, $P_4S_3$, and the like with olefinic hydrocarbons, aromatic hydrocarbons, phenolic compounds, alcohols, organic acids, and alkyl mercaptans and thiophenols.

For the purpose of this application, also intended within the meaning of organic acids are partial esters of inorganic acids which contain organic radicals to render the salts soluble in diesel fuel. For example, in U.S. Patent 2,894,951 are disclosed and claimed as novel compounds, heterocyclic polyamine salts of partial esters of phosphorodithioic acids of the formula $(RO)_2P(S)SH$, which are useful for improving the ignition characteristics of diesel fuels in accordance with this invention.

The partial esters of phosphorodithioic acids with which the hererocyclic polyamines are combined include alkyl, aryl, aralkyl and alkaryl phosphorodithioic acid esters in which the hydrocarbon groups contain 4 to 20 carbon atoms, and preferably those partial esters which contain two hydrocarbon groups. These groups may contain other substituents, such as oxygen, sulfur and nitrogen in the form of hydroxyl, thio or amino radicals.

The organic acids with which the heterocyclic polyamines are combined to form salts useful in this invention may include substituents such as halogens, hydroxyl radicals, sulfhydryl radicals and cyano radicals.

As specific examples of salts which may be used in accordance with this invention, the following are given:

(1) Piperazine salt of O,O′-di-2 ethylhexyl phosphorodithioic acid (2) N,N-dibutylpiperazine salt of O,O'-di (octylphenyl) phosphorodithioic acid (3) Ethylisomelamine salt of O,O'-didecyl phosphorodithioic acid (4) Hexamethylenetetramine salt of O,O'-didodecyl phosphorodithioic acid (5) Piperazine salt of S,S'-didodecyl phosphorodithioic acid (6) Hexamethylenetetramine salt of O,O'-di-2-ethylbutyl phosphorodithioic acid (7) N,N'-dioctylpiperazine salt of O,O'-diphenyl phosphorodithioic acid (8) Hexamethylenetetramine salt of O,O'-di(phenylpropyl) phosphorodithioic acid (9) N,N',N'' - trimethyltrimethylenetriamine salt of O,O'-di-2-ethylhexyl phosphorodithioic acid

(10) N-ethyl piperazine salt of benzenesulfonic acid

(11) Hexamethylenetetramine salt of 1-ethylbenzenesulfonic acid

(12) Ethylisomelamine salt of ω-phenyl-n-dodecylic acid

(13) Tri-n-propylcyclotrimethylenetriamine salt of 3-phenyl-n-butyric acid

(14) Piperazine salt of 6-cyclohexyl-n-nonyl carboxylic acid

(15) 2-cetylpiperazine salt of benzoic acid

(16) Decylisomelamine salt of cyclopentylacetic acid

(17) Hexamethylenetetramine salt of Sunaptic Acid B (a commercial naphthenic acid marketed by the Sun Oil Company)

(18) Hexylisomelamine salt of dibutyl phosphoric acid

(19) Hexamethylenetetramine salt of didecyl phosphorothionic acid

(20) Piperazine salt of di-2-ethylhexyl phosphorotetrathioic acid

(21) N,N'-dihexylpiperazine salt of palmitic acid

(22) N,N',N''-triethyltrimethylenetriamine salt of linoleic acid

(23) Hexamethylenetetramine salt of pimelic acid

(24) Piperazine salt of phthalic acid.

A small amount, preferably within the range of about 0.5 to 5 percent by weight of the fuel composition, of the heterocyclic polyamine salts is added to a diesel fuel to improve the ignition characteristics thereof. The polyamine salts of this invention can be added to diesel fuels with or without other well-known additives such as corrosion inhibitors, dyes, gum inhibitors, oxidation inhibitors, and the like.

In order to demonstrate the effectiveness of the heterocyclic polyamine salts in enhancing the cetane number of diesel fuels, a hexamethylenetetramine salt was prepared in accordance with U.S. Patent 2,894,951 by adding 83.5 grams of phosphorus pentasulfide to a mixture consisting of 195 grams of 2-ethylhexyl alcohol, 195 grams of toluene, and 195 grams of solvent-refined neutral oil having a viscosity of 85 SUS at 100° F. so that the mixture contained 0.38 mole of phosphorus pentasulfide to 1.5 moles of the alcohol. The mixture was stirred for four hours on a steam bath, and the resulting acid solution was then filtered and treated with 133 grams (0.94 mole) of hexamethylenetetramine at room temperature. After the mixture was allowed to react for 16 hours, it was diluted with hexane, and excess hexamethylenetetramine was removed by filtration. A crystallized product separated from the filtrate on chilling to a temperature of −30° F., attaining a yield of 90%. Recrystallization of this raw product from hexane yielded a white solid having a melting point of 69°–70° C. and containing 10.5% by weight of nitrogen, 6.1% by weight of phosphorus, and 12.8% by weight of sulfur. The analysis showed the product to be the substantially pure hexamethylenetetramine salt of O,O'-di-2-ethylhexyl phosphorodithioic acid, which theoretically contains 11.3% by weight nitrogen, 6.3% by weight phosphorus, and 13.0% by weight sulfur.

Sufficient amounts of the hexamethylenetetramine salt thus prepared were dissolved in separate portions of a commercial No. 2 diesel fuel, having a cetane number of 42.0 in order to achieve concentrations of 1% by weight and 3% by weight. Upon evaluation of the fuel composition containing 1% by weight of the additive, it was found to have a cetane number of 43.7, representing a cetane number improvement of 1.7 units. The diesel fuel sample containing 3% by weight of the additive was found to have a cetane number of 45.1, representing a cetane number improvement of 3.1 units over the fuel without the additive.

*Example I*

Other salts useful in this invention, namely, N,N'-dibutylpiperazine salt of O,O'-di(octylphenyl) phosphorodithioic acid, N-ethylpiperazine salt of benezenesulfonic acid, ethylisomelamine salt of ω-phenyl-n-dodecylic acid, hexamethylenetetramine salt of Sunaptic Acid B, piperazine salt of di-2-ethylhexyl phosphorotetrathioic acid are added to separate samples of a No. 1 diesel fuel to achieve concentrations of 1% by weight, 3% by weight, and 5% by weight. Upon evaluation of the samples containing the additives, they are found to have higher cetane numbers than the fuel without the additives.

It can be seen that I have found a group of salts which will improve the ignition characteristics of a diesel fuel when added in a small amount.

The embodiments of this invention in which an exclusive property or privilege is claimed are defined as follows:

1. A composition comprising a major portion of a petroleum diesel fuel oil and at least one oil-soluble heterocyclic polyamine salt of an organic acid in an amount sufficient to increase the cetane number of said oil, where the heterocyclic polyamine is selected from the group consisting of hexamethylenetetramine, cyclotrimethylenetriamines, piperazine, alkyl-substituted piperazine and alkylisomelamines.

2. A composition in accordance with claim 1, in which the salt is a heterocyclic polyamine salt of a phosphorodithioic acid of the formula $(RO)_2P(S)SH$ where R is a $C_4$–$C_{20}$ radical selected from the group consisting of alkyl, aryl, alkylaryl and arylalkyl radicals.

3. A composition in accordance with claim 2 in which the salt is a heterocyclic polyamine salt of a dialkyl phosphorodithioic acid.

4. A composition in accordance with claim 3 in which the salt is a heterocyclic polyamine salt of di-2-ethylhexyl phosphorodithioic acid.

5. A composition in accordance with claim 4 in which the salt is hexamethylenetetrammonium di-2-ethylhexyl phosphorodithioate.

6. A composition in accordance with claim 1 in which the polyamine is a tri-alkylcyclotrimethylenetriamine.

7. A composition in accordance with claim 1 in which the polyamine is a piperazine.

8. A composition in accordance with claim 1 in which the polyamine is an alkylisomelamine.

9. A composition in accordance with claim 1 in which the polyamine is hexamethylenetetramine.

10. A composition in accordance with claim 1 in which the salt is added in an amount of about 0.5–5.0% by weight of the composition.

11. An improved method of operating a diesel engine which comprises feeding to said diesel engine a fuel composition comprising a major portion of a petroleum diesel fuel oil and at least one oil-soluble heterocyclic polyamine salt of an organic acid in an amount sufficient to increase the cetane number of said oil, where the heterocyclic polyamine is selected from the group consisting of hexamethylenetriamine, cyclotrimethylenetriamines, piperazine, alkyl-substituted piperazine, and alkylisomelamines.

12. A method in accordance with claim 11 in which the salt is a heterocyclic polyamine salt of a phosphorodithiotic acid of the formula $(RO)_2P(S)SH$ where R is a $C_4$–$C_{20}$ radical selected from the group consisting of alkyl, aryl, alkylaryl, and arylalkyl radicals.

13. A method in accordance with claim 12 in which the salt is hexamethylenetetrammonium di-2-ethylhexyl phosphorodithioate.

14. A method in accordance with claim 11 in which the polyamine is hexamethylenetetramine.

15. A method in accordance with claim 11 in which the salt is added in an amount of about 0.5–5.0% by weight of the composition.

References Cited in the file of this patent

UNITED STATES PATENTS

| | | |
|---|---|---|
| 2,582,192 | Denison | Jan. 8, 1952 |
| 2,805,203 | Knapp et al. | Sept. 3, 1957 |
| 2,894,951 | Millikan et al. | July 14, 1959 |
| 2,973,323 | Millikan et al. | Feb. 28, 1961 |

UNITED STATES PATENT OFFICE
CERTIFICATE OF CORRECTION

Patent No. 3,129,699                      April 21, 1964

Allen F. Millikan

It is hereby certified that error appears in the above numbered patent requiring correction and that the said Letters Patent should read as corrected below.

Column 2, line 29, for "alicyclc" read -- alicyclic --; column 4, lines 71 and 72, for "hexamethylenetriamine" read -- hexamethylenetetramine --.

Signed and sealed this 8th day of September 1964.

(SEAL)
Attest:

ERNEST W. SWIDER                      EDWARD J. BRENNER
Attesting Officer                      Commissioner of Patents